United States Patent

Draghetti et al.

[11] Patent Number: 5,901,530
[45] Date of Patent: May 11, 1999

[54] WRAPPING METHOD FOR RIGID CIGARETTE PACKETS

[75] Inventors: Fiorenzo Draghetti, Medicina; Fulvio Boldrini, Ferrara, both of Italy

[73] Assignee: G.D S.p.A., Bologna, Italy

[21] Appl. No.: 08/975,036

[22] Filed: Nov. 18, 1997

[30] Foreign Application Priority Data

Nov. 18, 1996 [IT] Italy .................. BO96A0589

[51] Int. Cl.⁶ .................. B65G 43/00; B31B 5/02
[52] U.S. Cl. .................. 53/464; 53/491; 53/465; 53/456; 198/471.1
[58] Field of Search .................. 53/464, 491, 465, 53/456, 575; 198/471.1

[56] References Cited

U.S. PATENT DOCUMENTS

| | | | |
|---|---|---|---|
| 1,126,022 | 1/1915 | Jewell | 53/491 |
| 2,651,153 | 9/1953 | Burnett | 53/491 |
| 3,021,768 | 2/1962 | Graulig et al. | 53/575 |
| 3,572,003 | 3/1971 | Doraville et al. | 53/462 |
| 3,911,643 | 10/1975 | Davies | 53/170 |
| 4,086,744 | 5/1978 | Seragnoli | 53/137 |
| 4,636,186 | 1/1987 | Focke et al. | 493/142 |
| 4,883,163 | 11/1989 | Gamberini et al. | 198/471.1 |
| 5,148,654 | 9/1992 | Kisters | 53/462 |
| 5,415,280 | 5/1995 | Balboni et al. | 198/435 |

FOREIGN PATENT DOCUMENTS 25 51 538 5/1977 Germany.
41 36 179 5/1993 Germany.

*Primary Examiner*—Peter Vo
*Assistant Examiner*—A. Dexter Tugbang
*Attorney, Agent, or Firm*—Cushman Darby and Cushman IP Group of Pillsbury Madison & Sutro LLP

[57] ABSTRACT

At a certain stage in the fabrication of a rigid cigarette packet, which appears essentially as a rectangular cup or body with a coaxial lid, the partly formed packet is transferred from a first feed path onto a second feed path, still having longitudinal flaps that project on either side from a front face of the body and a front face of the lid; the transfer is effected by means of a device that includes in a rotatable platform with at least one gripper head designed to engage at least the two front faces of the single packet in such a way that the body and lid remain stably interconnected, and during the course of the transfer movement to rotate the packet through 90° about an axis which is normal to the front faces.

6 Claims, 4 Drawing Sheets

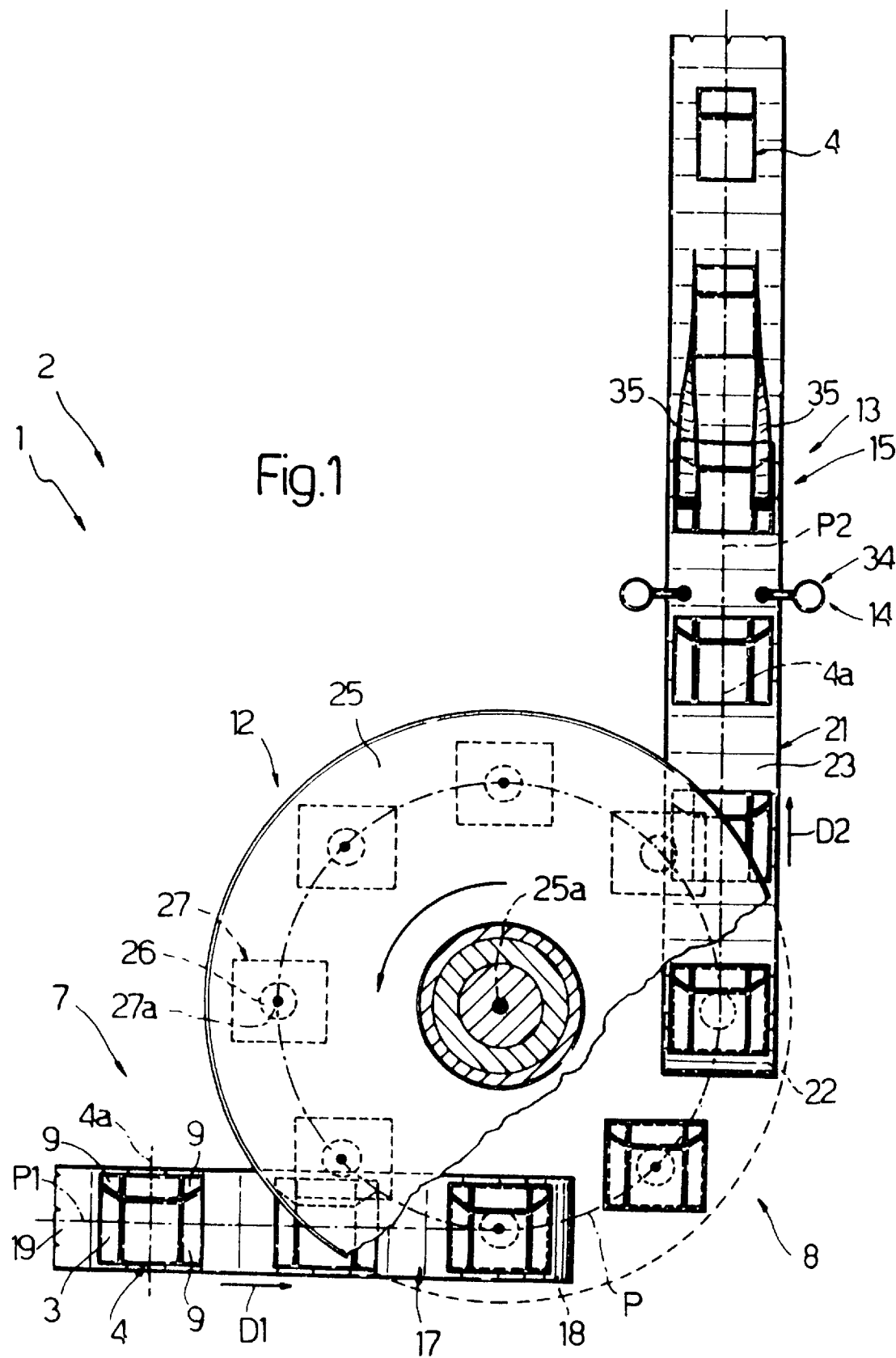

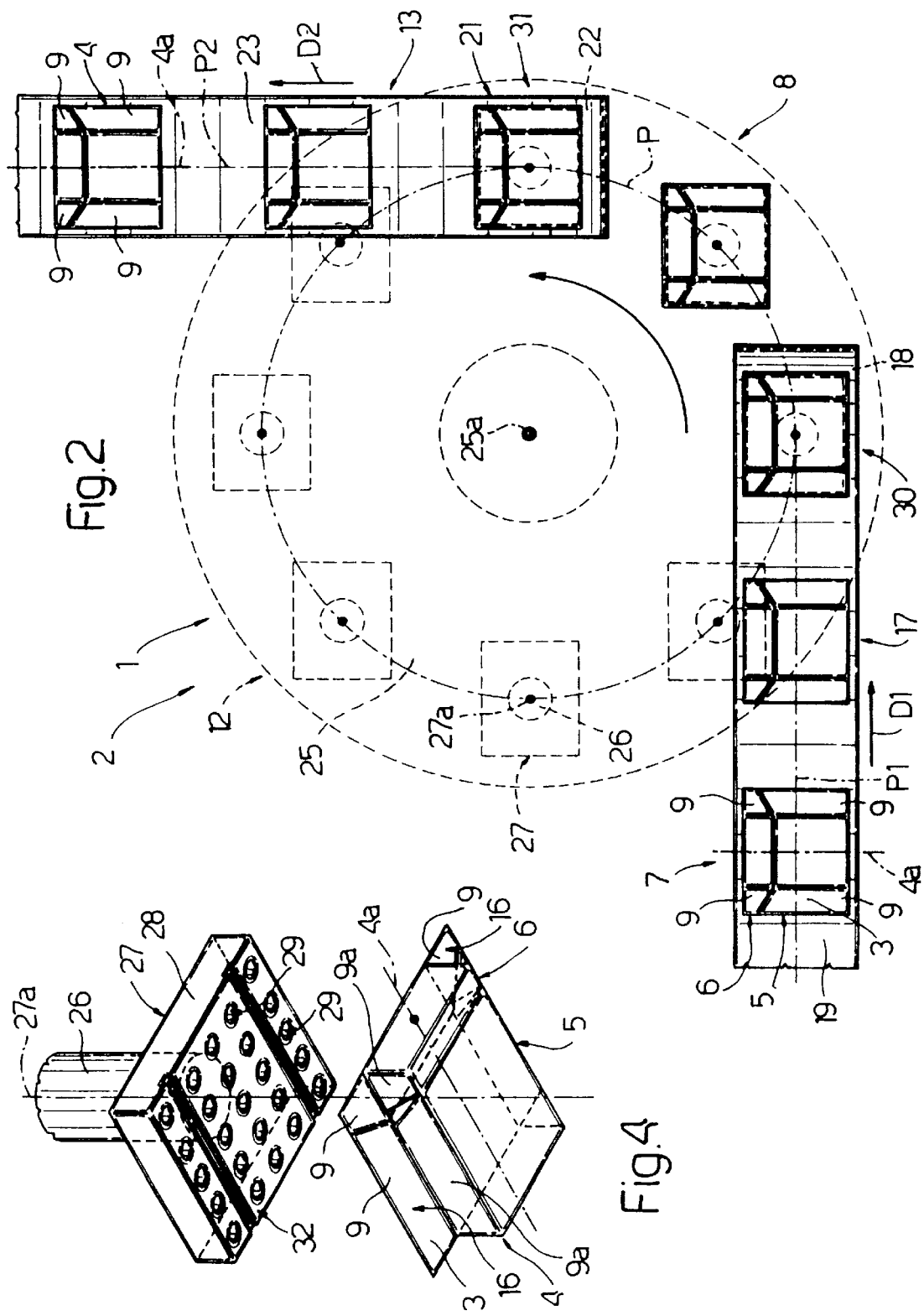

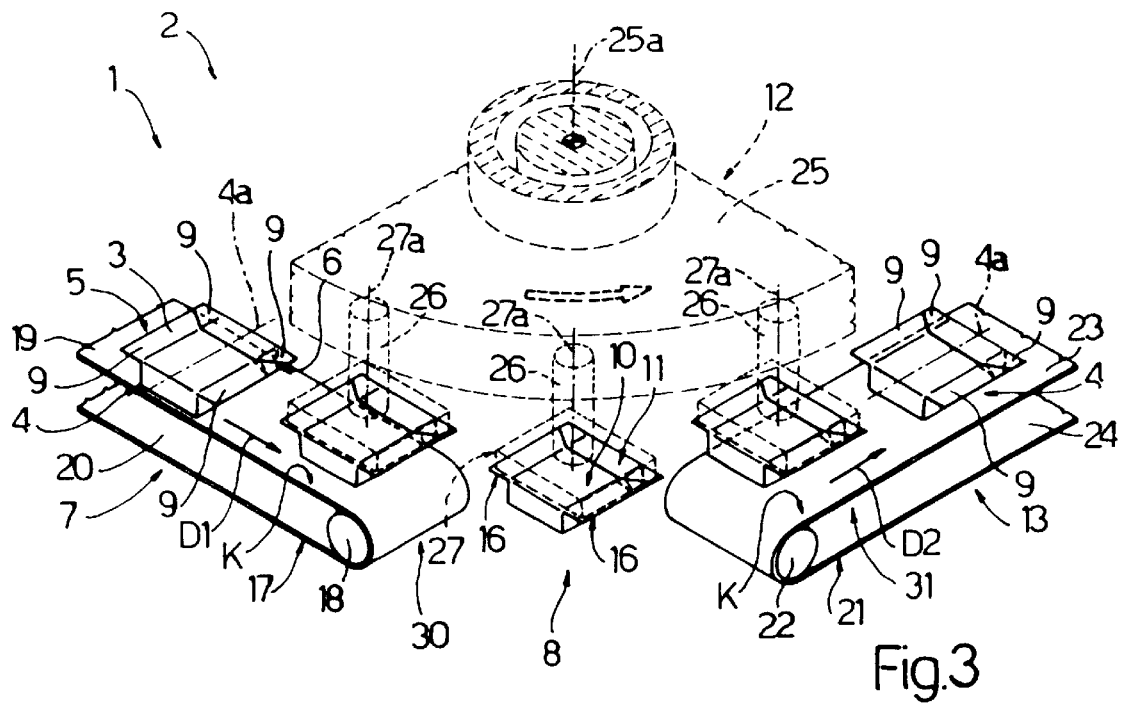
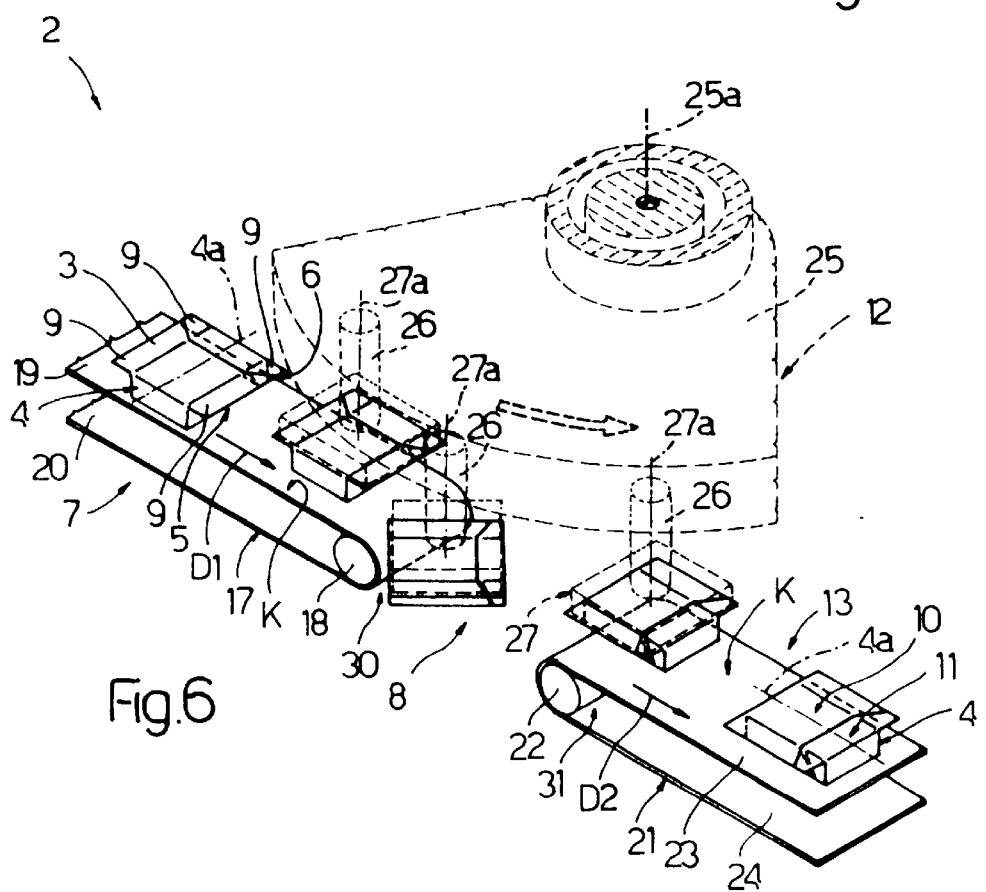

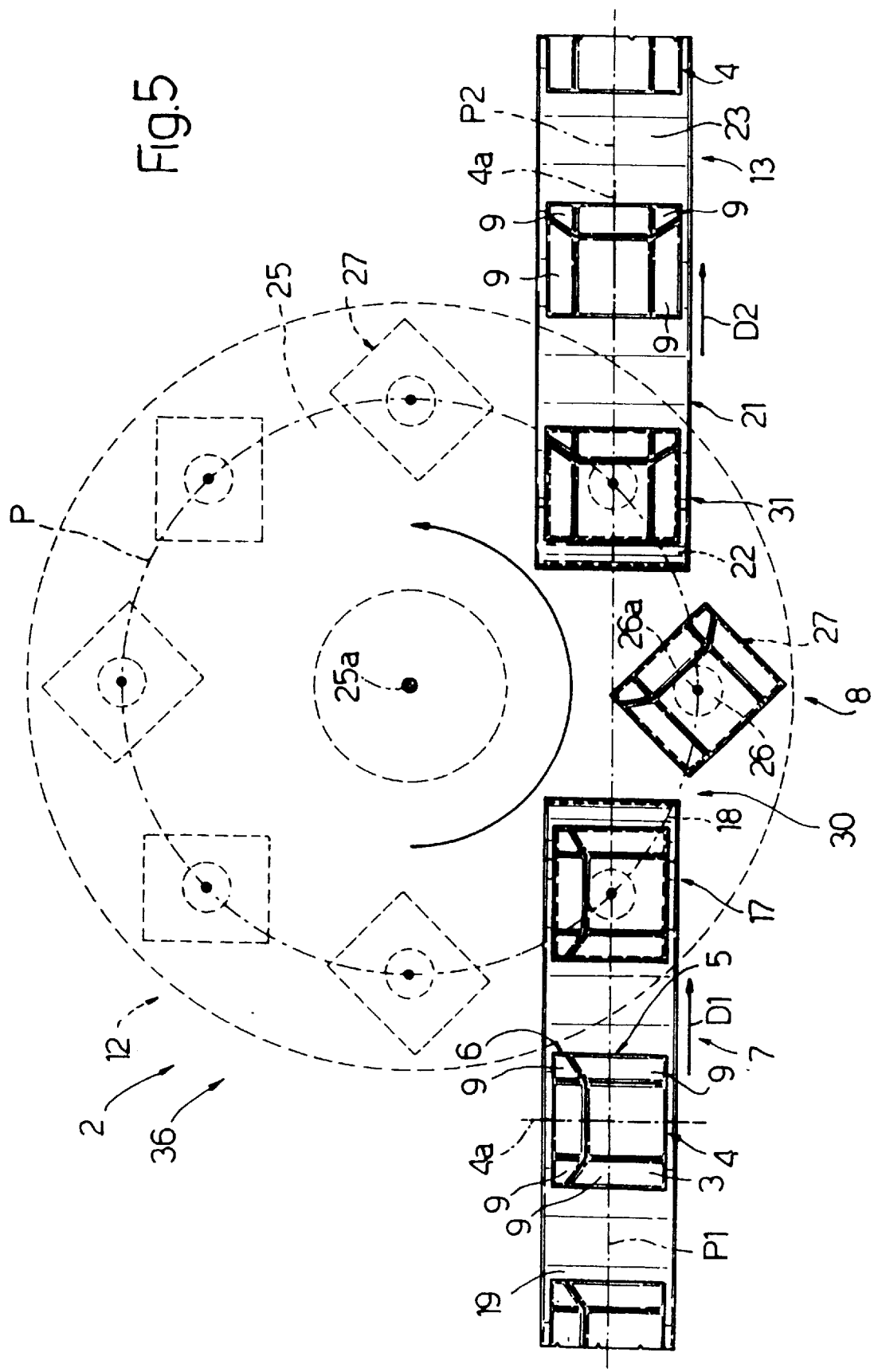

WRAPPING METHOD FOR RIGID CIGARETTE PACKETS

BACKGROUND OF THE INVENTION

The present invention relates to a wrapping method for rigid cigarette packets.

The invention finds application to advantage in wrapping machines as used to manufacture cigarette packets of the type comprising a cupped body and a lid disposed coaxially in relation to the body, of which the two smaller side or flank faces are incorporated as pairs of longitudinal flaps joined in overlapping contact and glued together.

In conventional machines of the type in question, each successive packet is fashioned typically by advancing a die-cut blank of wrapping material together with a respective group of cigarettes enveloped in a sheet of foil paper along a predetermined first direction, following a first feed path, and folding the blank gradually about the group of cigarettes to the point of producing a partly formed packet, that is to say a packet in which one longitudinal flap of each pair projects laterally from a front face of the body and lid, as yet uncompleted, and the remaining flap of the pair is bent to a right angle. The partly formed packets advance along the first path in this configuration, with the respective longitudinal flaps transversely disposed, toward a transfer station where each packet in turn is engaged axially by its end faces through the agency of a transfer device invested with alternating movement across the first feed path and in a second direction transverse to the first direction.

Thereafter, each of the partly formed packets is repositioned with the respective longitudinal flaps parallel to the second direction and directed thus along a second path that extends through a gumming station, where glue is applied to selected portions of the flaps, and through a folding station where the projecting flaps are bent inwards to a right angle and stuck to the flaps folded previously, thereby completing the packet.

Conventionally, the transfer of each packet from the first path to the second path is effected by engaging the end faces of the cupped body and the lid at one and the same time and thus applying a rigid restraint to the partly formed packet, given firstly that the blank tends naturally to spring back toward its initial flat configuration notwithstanding that dabs of glue will already have been applied to certain points on the inside of the body, and secondly that the lid is completely free to unfold having received no glue on any part as yet.

The method briefly outlined above has certain drawbacks which derive chiefly from the transfer of the packets between the first and the second path, inasmuch as the transfer device is relatively slow in comparison to the conveying devices with which it is associated, and tends also to engage each single packet in a decidedly abrupt manner, not least in order that the transfer operation will be brought about more speedily. Being intermittent in operation, moreover, transfer devices of the type in question are not able to exceed a given maximum output speed, since at speeds higher than the intended maximum the resulting vibrations will be such as to jeopardize the structure and reliability of the machine as a whole.

SUMMARY OF THE INVENTION

The object of the present invention is to provide a wrapping method such as will be unaffected by the drawbacks mentioned above.

The stated object is realized according to the present invention in a wrapping method for rigid cigarette packets, each presenting a cupped body, a lid disposed in coaxial alignment with the cupped body on a first longitudinal axis of the packet, and longitudinal flaps disposed parallel to the first axis, projecting laterally from a front face of the cupped body and from a front face of the lid. Such a method comprises a step of advancing the single packets along a first predetermined feed path and in a first predetermined feed direction, each with the relative longitudinal flaps disposed transversely to the first direction, then a step of transferring each packet from the first feed path to a second predetermined feed path, and a step of advancing the single packets along the second feed path in a second direction, each with the respective longitudinal flaps disposed parallel to the second direction, which in turn includes a subsidiary step of gumming an underside portion of each flap and a subsidiary step of bending the flaps through 90° in relation to the corresponding front faces In the method disclosed, the step of transferring packets from the first feed path to the second feed path is effected in such a way as to produce a rotation of each packet through a right angle about a respective second axis perpendicular to the front faces, and moreover, the transfer step includes the subsidiary step of engaging the cupped body and the lid of the single packet by means of a gripper head capable of movement from the first to the second path and comprising an element by which the cupped body and its lid are rigidly interconnected.

BRIEF DESCRIPTION OF THE DRAWINGS

The invention will now be described in detail, by way of example, with the aid of the accompanying drawings, in which:

FIG. 1 is a schematic plan view of a wrapping machine for implementation of the method according to the present invention, illustrated in a first preferred embodiment and with certain parts omitted for clarity;

FIG. 2 illustrates an enlarged detail of FIG. 1;

FIG. 3 is an enlarged detail of FIG. 1 illustrated in perspective, with parts in section and parts omitted for clarity;

FIG. 4 is an enlarged detail of FIG. 3 illustrated in perspective, with parts in section and parts omitted for clarity;

FIG. 5 is a schematic plan view of the machine as in FIG. 1, illustrated in a second preferred embodiment; and FIG. 6 is an enlarged detail of FIG. 5 illustrated in perspective, with parts in section and parts omitted for clarity.

DESCRIPTION OF THE PREFERRED EMBODIMENTS

With reference to FIGS. 1 and 2 of the drawings attached hereto the numeral, 1 denotes a central portion of a wrapping machine, denoted 2 in its entirety, by which a die-cut blank 3 is folded about a respective group (not indicated) of cigarettes (not indicated) in such a way as to fashion a rigid packet 4 that comprises a cupped body, denoted 5, and a lid 6 aligned coaxially with the body 5 on a main longitudinal axis 4a of the packet.

The central portion 1 of the machine comprises a first belt conveyor 7 by which the packets 4 are advanced continuously along a feed path P1 that extends through a transfer station 8. Still not fully formed at this stage, each packet 4 has respective longitudinal flaps 9 which are disposed parallel to the aforementioned longitudinal axis 4a, which project laterally both from a front face 10 of the body 5 and from a front face 11 of the lid 6, the two faces 10 and 11 occupying a common plane.

Also forming part of the central portion 1 are a transfer device 12 coinciding with the station 8, and a second belt conveyor denoted 13, by which each packet 4 is received from the transfer device 12 and advanced continuously, parallel with its longitudinal axis 4a, along a feed path P2 that passes through a gumming station 14 where the flaps 9 are gummed along respective downwardly directed surfaces 16 (FIG. 4), and a folding station 15 at which the flaps 9 are bent through a right angle in relation to the front faces 10 and 11 and united with corresponding longitudinal flaps 9a folded previously in similar fashion, thereby completing the formation of the packet 4.

As illustrated in FIG. 3, the first conveyor 7 consists in a belt 17 looped around two pulleys 18 (one only of which is indicated) in such a way as to establish a transport branch 19 and a return branch 20, of which the transport branch 19 extends along the first feed path P1, advancing the packets 4 in a predetermined feed direction D1 to which their respective axes 4a are transversely disposed, and terminates at the transfer station 8. The second conveyor 13 includes a belt 21 looped around two pulleys 22 (one only of which is indicated), generating a transport branch 23 and a return branch 24, of which the transport branch 23 occupies the same horizontal plane K as the transport branch 19 of the first conveyor 7 and extends away from the transfer station 8 along the second path P2; the packets 4 in this instance are caused to advance on the transport branch 23 with their axes 4a disposed longitudinally, following a predetermined second feed direction D2 which is disposed normal to the first feed direction D1.

The transfer device 12 consists in a familiar rotating platform unit, substantially of the type disclosed in U.S. Pat. No. 4,883,163, and comprises a turntable 25 that will be set in rotation counter clockwise, as observed in FIG. 1, by conventional drive means (not illustrated) about an axis 25s substantially normal to the conveying plane K. The turntable 25 is equipped on its underside with a plurality of mutually parallel output shafts 26 which are distributed uniformly around and rotatable thus, together with the turntable 25, about the axis 25a.

As discernible from FIG. 4, the bottom ends of the single shafts 26 are fitted with respective gripper heads 27 by which packets 4 advancing on the first conveyor 17 are picked up singly and transferred to the second conveyor 21; in effecting the transfer, the heads 27 are caused also to rotate about respective individual axes 27a which are disposed parallel with the center axis 25a, turning at angular velocities identical to that of the turntable 25, through the agency of a conventional epicyclic train that is not illustrated in the drawings.

In particular, each head 27 comprises a rigid plate 28 appearing substantially rectangular when viewed in plan, of which the bottom face provides a plurality of suction holes 29 connected with a source of negative pressure (conventional and not illustrated) and is designed to engage both the front faces 10 and 11 and the flaps 9 of each single packet 4 in such a way that the body 5 and the respective lid 6 thereof can be kept rigidly associated when that packet 4 is lifted from the first conveyor 17 and deposited on the second conveyor 21. Moreover, the shafts 26 are designed to rotate about their respective axes 27a in the direction opposite to that of the turntable 25, in such a manner that the combined angular movements of the turntable 25 and of the shafts 26 will ensure the corresponding heads 27 can be maintained parallel with themselves and with the feed direction D1 as each successive packet 4 is rotated through 90° about the respective axis 27a.

Finally, the shafts 26 are coupled, in a familiar manner, to conventional actuator means (not shown) located internally of the turntable 25, of which the function is to shift the individual shafts 26 axially between a raised operating position and a lowered operating position.

With the turntable 25 set in rotation, the gripper heads 27 (and more exactly the respective axes 27a) are caused to describe a substantially circular path P, passing first through a pickup station 30 that will coincide with the runout end of the first conveyor 17 at a point where the corresponding feed direction D1 lies substantially tangential to the circular path P, then through a release station 31 coinciding with the entry end of the second conveyor 21; in the example of FIG. 2, the head 27 completes an arc of 90° in passing along the circular path P from one station 30 to the other station 31 in the direction of rotation of the turntable 25.

In operation, the part-completed packets 4 are advanced continuously along the first feed path P1 by the respective conveyor 7, timed in such a way that each one converges on the pickup station 30 simultaneously with a respective gripper head 27; having reached the station 30, the head 27 will be caused by the actuator means to descend from the raised operating position to the lowered operating position as soon as the respective plate 28 is directly over the packet 4.

Once the downwardly directed surface 32 of the rigid plate 28 enters into contact with the front faces 10 and 11 and flaps 9 of the respective packet 4, a control valve of conventional embodiment (not illustrated) associated with the aforementioned source of negative pressure will cause suction to be generated through the holes 29, with the result that the faces 10 and 11 and the flaps 9 of the packet are retained in flush contact with the surface 32, and the cupped body 5 and the relative lid 6 remain rigidly interconnected. At this point the head 27 is caused by the actuator means to reascend to from its lowered operating position to the raised operating position, thereby distancing the packet 4 from the transport branch 19 of the belt 17.

During the transfer from the pickup station 30 to the release station 31, with the turntable 25 and heads 27 rotating about their respective axes 25a and 27a, the single packet 4 is caused by the resulting combination of angular movements to pivot through 90° about the axis 27a of the head 27, and, upon nearing the release station 31, becomes disposed with its main longitudinal axis 4a parallel to the second feed direction D2.

Arriving substantially at the release station 31, the head 27 is returned by the actuator means to the lowered operating position, whereupon suction through the holes 29 of the plate 28 is cut off by the control valve and the relative packet 4 is released onto the transport branch 23 of the second belt 21. Advancing continuously, the packet 4 passes through the gumming station 14 where the downward facing surfaces 16 of the flaps 9, now parallel with the feed direction D2, are gummed by a device 33 of familiar embodiment, and thereafter through the folding station 15 where the gummed flaps 9 are engaged by two helical foils 34, bent at right angles to the respective front faces 10 and 11 and flattened against the respective flaps 9a already in place (FIG. 4), completing the formation of the cigarette packet 4.

In the example of FIGS. 5 and 6 which illustrate a central portion 36 of a wrapping machine 2 similar to the central portion 1 considered thus far, the manner of implementing the method differs in that the first and second feed directions D1 and D2 are now mutually parallel, while the gripper heads 27 are no longer translated parallel with a fixed axis when passing from the pickup station 30 to the release station 31. Also, the two feed paths P1 and P2 are aligned one with another, intersecting the circular path P at points coinciding with the two stations 30 and 31.

The operation of this central portion 36 is readily discernible from that of the portion denoted 1, and therefore requires no further explanation. It will be advantageous rather to emphasize the fact that the turntable device provides a flexibility which is instrumental in allowing the transfer of successive packets 4 between two conveyors 7 and 13 with feed directions D1 and D2 compassing any given angle between 0° and 180°, thus eliminating layout problems.

What is claimed is:

1. A method for wrapping partially formed rigid cigarette packets, each presenting a cupped body, a lid disposed in coaxial alignment with the cupped body on a first longitudinal axis of the packet, and longitudinal flaps disposed parallel to the first longitudinal axis, projecting laterally from a front face of the cupped body and from a front face of the lid, comprising the steps of:

advancing the partially formed packets singly in succession along a first predetermined feed path in a first direction, each with said longitudinal flaps thereof disposed transversely to the first direction;

transferring each said partially formed packet singly in succession from the first feed path to a second predetermined feed path; and advancing said partially formed packets simply in succession along the second feed path in a second direction, each with said longitudinal flaps thereof disposed parallel to said longitudinal flaps thereof disposed parallel to said second direction;

said step of advancing including gumming an underside portion of each said flap of each said partially formed packet singly in succession bending both said flaps, after said gumming, each through a right angle in relation to the corresponding said front faces;

said transferring including engaging the cupped body and the lid of each said partially formed packet simply in succession by a respective gripper head which is capable of movement from said first path to said second path and having an element having a bottom face having a plurality of suction holes by which the cupped body and the respective lid are rigidly interconnected during said transferring, by suction gripping said front faces of said cupped body and respective lid, and both of the respective said longitudinal flaps of each said partially formed packet singly in succession;

said engaging including causing a rigid element of each gripper head to engage each partially framed packet in succession, by interaction with said front faces of the respective said cupped body and the respective said lid, and with both respective said longitudinal flaps, said rigid element having a pattern of suction holes provided in a substantially rectangular pattern.

2. A method as in claim 1, comprising:

providing said gripper head as part of a transfer device which includes a rotating platform positioned between a first conveyor extending along said first feed path and a second conveyor extending along said second feed path.

3. A method as in claim 2, wherein:

said first and second conveyors are continuous conveyors by which each said partially formed packet is caused to advance continuously in succession along said first and second paths.

4. A method as in claim 1, wherein:

said first direction is disposed transversely to said second direction.

5. A method as in claim 1, wherein:

said first direction is disposed parallel to said second direction.

6. A method as in claim 1, where:

said rigid element comprises a pneumatic plate which provides gripping of the respective said front faces through suction.

* * * * *